(12) United States Patent
Wong et al.

(10) Patent No.: US 8,482,508 B2
(45) Date of Patent: *Jul. 9, 2013

(54) LCD PANEL WITH MULTIPLE-VIEW DIRECTION AND DISPLAY DEVICE UTILIZING THE SAME

(75) Inventors: Shih-Fang Wong, Taipei Hsien (TW); Xin Lu, Shenzhen (CN); Yu-Cui Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 907 days.

This patent is subject to a terminal disclaimer.

(21) Appl. No.: 12/605,362

(22) Filed: Oct. 25, 2009

(65) Prior Publication Data

US 2011/0050555 A1    Mar. 3, 2011

(30) Foreign Application Priority Data

Aug. 31, 2009  (CN) .......................... 2009 1 0306370

(51) Int. Cl.
*G06G 5/00* (2006.01)
*G06G 3/36* (2006.01)
*G06G 5/10* (2006.01)
*G06G 5/02* (2006.01)
*G06F 3/038* (2006.01)
*G02F 1/1335* (2006.01)
*G02F 1/1347* (2006.01)
*F21V 33/00* (2006.01)
*F21V 7/04* (2006.01)
*F25D 27/00* (2006.01)
*F27D 21/02* (2006.01)
*A47F 3/00* (2006.01)
*H03H 9/00* (2006.01)

(52) U.S. Cl.
USPC ........ 345/102; 345/4; 345/5; 345/87; 345/88; 345/89; 345/90; 345/95; 345/100; 345/204; 345/690; 345/691; 345/692; 345/693; 345/694; 345/695; 345/696; 345/697; 345/698; 349/64; 349/80; 349/106; 349/108; 362/561

(58) Field of Classification Search
USPC .......................................................... 345/102
See application file for complete search history.

(56) References Cited

U.S. PATENT DOCUMENTS

| | | | |
|---|---|---|---|
| 2005/0146662 A1* | 7/2005 | Inoue et al. ................... | 349/129 |
| 2005/0237471 A1* | 10/2005 | Kawamura .................... | 349/158 |
| 2006/0082586 A1* | 4/2006 | Noorbakhsh et al. ......... | 345/535 |
| 2007/0058127 A1* | 3/2007 | Mather et al. ................. | 349/159 |
| 2007/0182885 A1* | 8/2007 | Egi et al. ........................ | 349/96 |

(Continued)

*Primary Examiner* — Alexander S Beck
*Assistant Examiner* — K. Kiyabu
(74) *Attorney, Agent, or Firm* — Altis Law Group, Inc.

(57) ABSTRACT

A LCD display device includes a LCD panel including a plurality of LCD units with trapezoid structure, and three sides of the LCD unit all include three liquid crystal molecules (LCM), the LCMs of all of the first side of the LCD unit constitute a first LCM array and form a first display interface, the LCMs of all of the second side constitute a second LCM array and form a second display interface, and the LCMs of all of the third side constitute a third LCM array and form a third display interface. The LCD display device also includes three signal conversion modules configured to convert three display signals into three control signals respectively, and three driving modules configured to drive the three LCM arrays according to the control signals and cause the first, the second, and the third display interface to display corresponding images.

7 Claims, 4 Drawing Sheets

U.S. PATENT DOCUMENTS

2009/0040426 A1* 2/2009 Mather et al. ............... 349/65
2009/0109126 A1* 4/2009 Stevenson et al. ............ 345/4
2010/0014313 A1* 1/2010 Tillin et al. ............... 362/606
2010/0073332 A1* 3/2010 Gettemy et al. ............ 345/204

* cited by examiner

LCD PANEL WITH MULTIPLE-VIEW DIRECTION AND DISPLAY DEVICE UTILIZING THE SAME

BACKGROUND

1. Related Applications

This application is related to co-pending application Ser. No. 12/605,361 entitled, "LCD TELEVISION", filed Oct. 25, 2009.

2. Technical Field

The disclosure relates to display devices and, particularly, to an LCD display device.

3. Description of Related Art

LCD display devices are commonly used due to low radiation and minimal flickering.

However, a commonly used LCD display is capable of displaying only a single image corresponding to a single display signal. If only one LCD display is deployed, despite the presence of multiple signal-generating computer hosts, only the signal of one host can be displayed, and the others unused.

Therefore, it is beneficial to provide a display device overcoming the limitations described.

BRIEF DESCRIPTION OF THE DRAWINGS

The components in the drawings are not necessarily drawn to scale, the emphasis instead being placed upon clearly illustrating the principles of the LCD display device. Moreover, in the drawings, like reference numerals designate corresponding parts throughout the several views.

DETAILED DESCRIPTION

Figure 1:
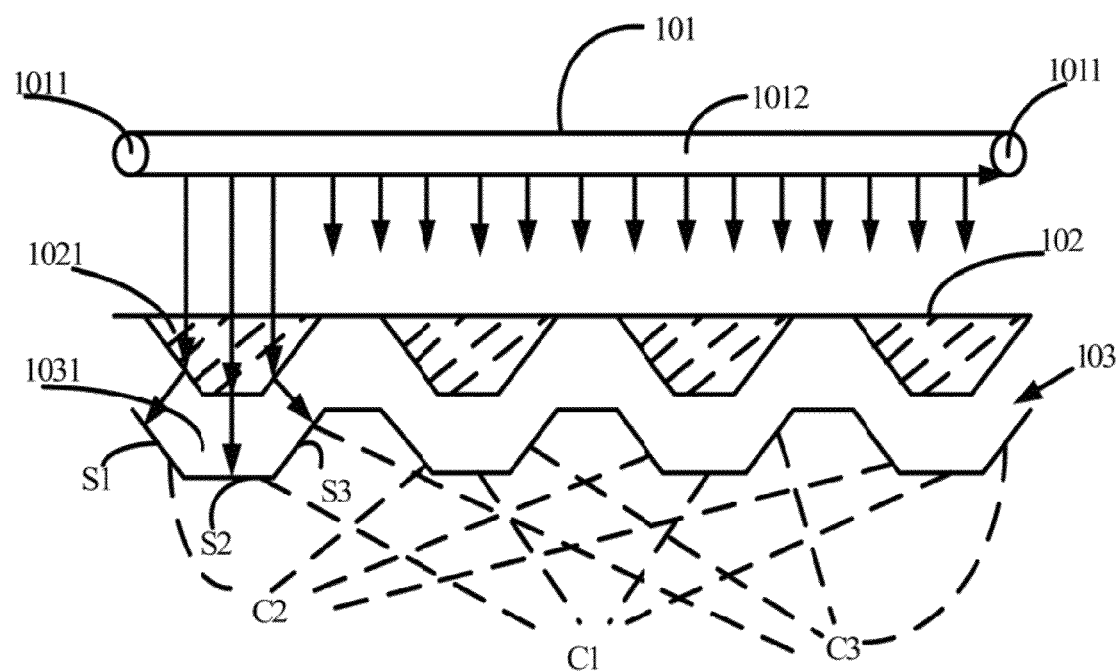
FIG. 1 is a structural diagram of an LCD panel in accordance with an exemplary embodiment.

Referring to FIG. 1, an LCD panel 10 includes a backlight unit 101, a light-guide unit 102, and an LCD array unit 103. The backlight unit 101 is configured to emit light and provide light to the LCD panel 10. The light-guide unit 102 is configured to direct the light emitted by the backlight unit 101 to the LCD array unit 103. In the embodiment, the backlight unit 101 includes a light source 1011 and a reflective panel 1012. The reflective panel 1012 reflects the light emitted by the light source 1011 and directs the light to the light-guide unit 102. The light-guide unit 102 is a transparent panel including a plurality of objects 1021 of trapeziform shape (hereinafter, trapeziform object 1021). The LCD array unit 103 includes a plurality of LCD units 1031 with a concave structure. To more clearly describe the embodiment of the present invention, three sides of one LCD unit 1031 are defined as a first side S1, a second side S2, and a third side S3 respectively. Each LCD unit 1031 corresponds to a trapeziform object 1021 and the three sides of the LCD unit 1031 are parallel to the three surfaces of the trapeziform object 1021, respectively. When light reflected by the reflective panel 1012 reaches the light-guide unit 102, the light-guide unit 102 guides the light upwards to three surfaces of the trapezium object 1021 and directs it to the three sides of the LCD unit 1031, respectively.

Figure 2:
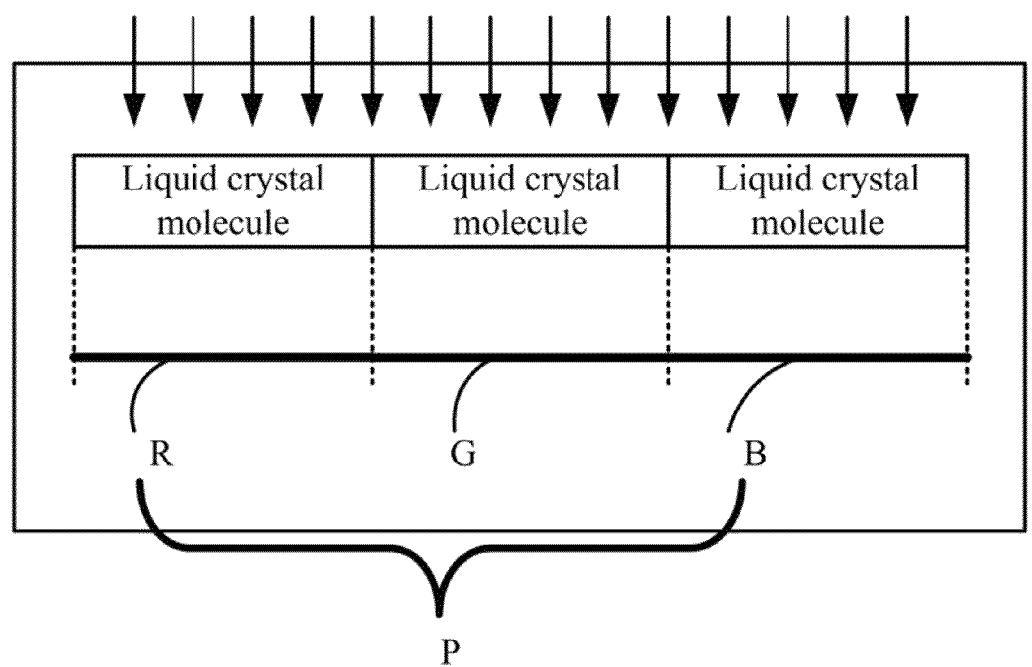
FIG. 2 is a schematic diagram of an LCD unit of the LCD panel of FIG. 1.

Referring also to FIG. 2, each of the sides S1, S2, S3 includes three liquid crystal molecules and three filters. The three liquid crystal molecules are between the trapeziform object 1021 and the three filters. In the embodiment, the three filters are red, green, and blue respectively. Light incident on the red filter is filtered and only red is emitted. When light is incident on the green filter, the green filter filters the light and only green is emitted. When light is incident on the blue filter, the blue filter filters the light and only blue is emitted. The three liquid crystal molecules in one side of the LCD unit 1031 correspond to a pixel point P. As described, the light-guide unit 102 guides the light to the first side S1, the second side S2, and the third side S3, and provides them with light. If a liquid crystal molecule is rotated to allow passage of light, the area of the LCD panel 10 corresponds to the liquid crystal molecule displays corresponding color due to filtering function of corresponding filter. If the liquid crystal molecule is rotated and does not allow light through, the area of the LCD panel 10 corresponding to the liquid crystal molecule displays black. Thus, the three liquid crystal molecules compose a certain color and the area of the LCD panel 10 corresponding to the pixel point P displays the resulting color.

Referring to FIG. 1 again, in the embodiment, the liquid crystal molecules of the first side S1 constitute a first liquid crystal molecule array C1, the liquid crystal molecules of the second side S2 constitute a second liquid crystal molecule array C2, and the liquid crystal molecules of the third side S3 constitute a third liquid crystal molecule array C3. Each liquid crystal molecule array is controlled by a unique control module (not shown).

Figure 3:
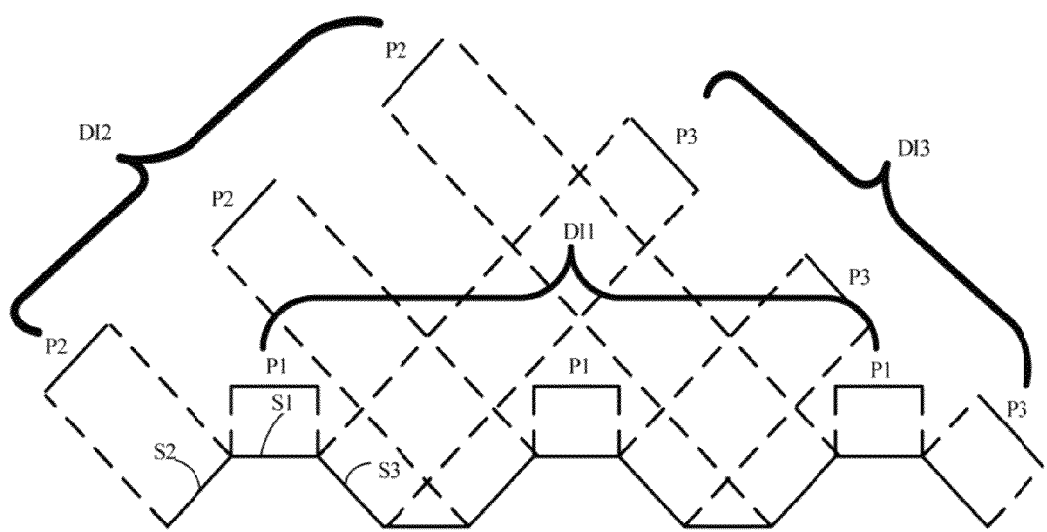
FIG. 3 is a schematic diagram showing a viewing angle of the LCD panel of FIG. 1.

Referring also to FIG. 3, each three liquid crystal molecules of the first side S1 constitute a first pixel point P1, each three liquid crystal molecules of the second side S2 constitute a second pixel point P2, and each three liquid crystal molecules of the third side S3 constitute a third pixel point P3 respectively. All of the first pixel points P1 of the first liquid crystal molecule array C1 form a first display interface DI1 to display images visible from a first viewing angle; all of the second pixel points P2 of the second liquid crystal molecule array C2 form a second display interface DI2 to display images visible from a second viewing angle, and all of the third pixel points P3 of the third liquid crystal molecule array C3 form a third display interface DI3 to display images visible from a third viewing angle. In the embodiment, the first viewing angle is the viewing angle from the front, the second viewing angle is the viewing angle from the left, and the third viewing angle is the viewing angle from the right.

Each first pixel point P1 of the first display interface DI1 displays a different color and the first display interface DI1 displays an entire image. As the same, the second display interface DI2, and the third display interface DI3 display an entire image accordingly. In the embodiment, sizes of LCD unit 1031 and the trapeziform object 1021 of the light-guide unit 102 are very small, usually are sized on a nanometric scale, such that, despite blank areas in the first display interface DI1, the image displayed thereon still appears integrated. Similarly, the images respectively displayed by the second display interface DI2 and the third display interface DI3 also appear integrated.

Figure 4:
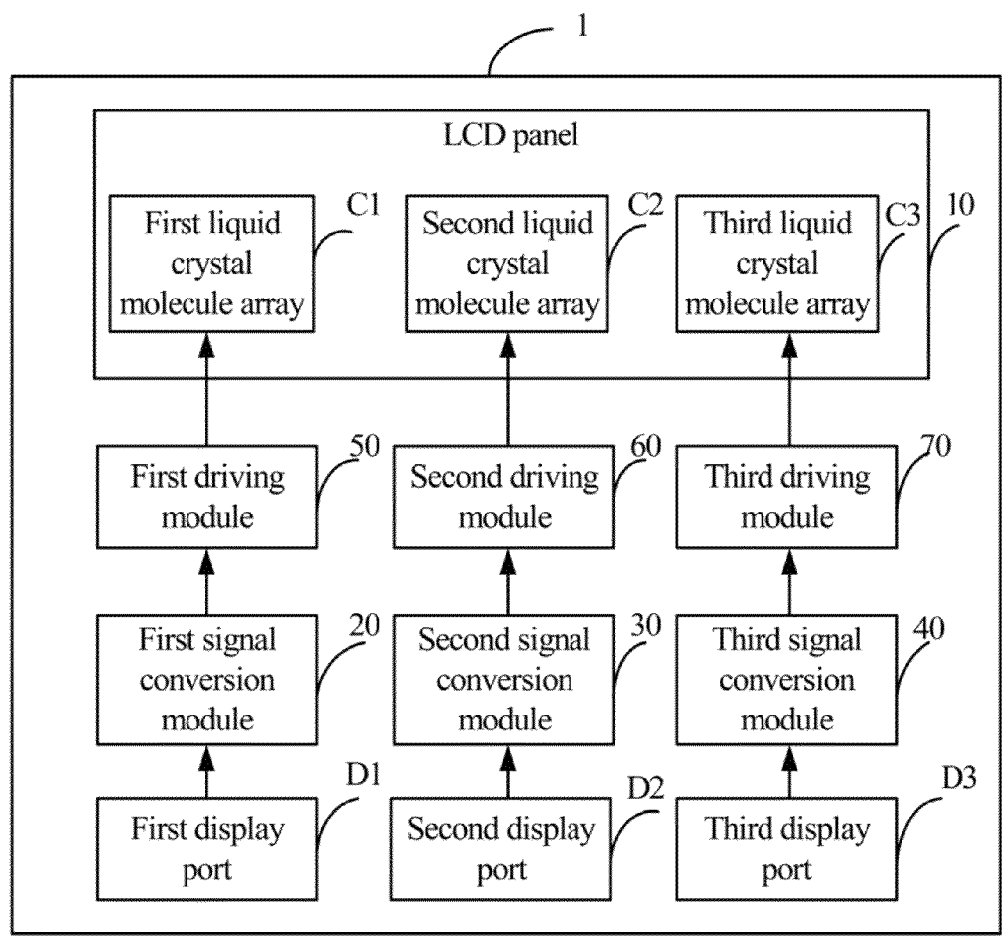
FIG. 4 is a block diagram of an exemplary embodiment of a LCD display device as disclosed.

Referring also to FIG. 4, a LCD display device 1 includes a first display port D1, a second display port D2, and a third display port D3. Each of the display ports is configured to connect to a computer host and receive display signals produced thereby.

The LCD display device 1 further includes the LCD panel 10, a first signal conversion module 20, a second signal conversion module 30, a third signal conversion module 40, a first driving module 50, a second driving module 60, and a third driving module 70. The first signal conversion module 20 is connected between the first display port D1 and the first driving module 50, and is configured to convert the display signals received by the first display port D1 into a first control signal. The second signal conversion module 30 is connected between the second display port D2 and the second driving module 60, and is configured to convert the display signals received by the second display port D2 into a second control signal. The third signal conversion module 40 is connected between the third display port D3 and the third driving module 70, and is configured to convert the display signals received by the third display port D3 into a third control signal. The first driving module 50 is connected to the first liquid crystal molecule array C1, and directs the liquid crystal molecules of the first liquid crystal molecule array C1 to rotate according to the first control signal. The second driving module 60 is connected to the second liquid crystal molecule array C2, and directs the liquid crystal molecules of the second liquid crystal molecule array C2 to rotate according to the second control signal. The third driving module 70 is connected to the third liquid crystal molecule array C3, and directs the liquid crystal molecules of the third liquid crystal molecule array C3 to rotate according to the third control signals.

In detail, when the first display port D1 receives display signals from a computer host, the first signal conversion module 20 converts the display signals into the first control signal, the first driving module 50 directs the liquid crystal molecules of the first liquid crystal molecule array C1 to rotate according to the first control signal, and the first display interface DI1 displays the image corresponding to the display signals received by the first display port D1. In a like manner, the second display interface DI2 displays the image corresponding to the display signals received by the second display port D2, and the third display interface DI3 displays the image corresponding to the display signals received by the third display port D3. In the embodiment, the first driving module 50, the second driving module 60, and the third driving module 70 are driving electrodes. The first display port D1, the second display port D2, and the third display port D3 are video graphics array (VGA) port, digital visual interface (DVI) port, or universal serial bus (USB) port respectively. Two or all of the first display port D1, the second display port D2, and the third display port D3 can also be the same type.

In other embodiments, the first signal conversion module 20, the second signal conversion module 30, and the third signal conversion module 40 can be replaced by a processing unit (not shown) connected between the three display ports and the three driving modules, executing the signal converting function by time division multiplex mode. Namely, the processing unit converts the display signals from the display ports D1, D2, D3 into control signals seriatim, and the driving modules 50, 60, 70 rotate the corresponding liquid crystal molecule array C1, C2, C3 when receiving the control signals respectively.

Therefore, in the present disclosure, the LCD display 1 is capable of connecting to three different computer hosts and displaying content therefrom simultaneously. For example, content corresponding to signals from the first computer host can be viewed on the front of the LCD display 1, content corresponding to signals from the second computer host can be viewed on the left of the LCD display 1, and content corresponding to signals from the third computer host can be viewed on the right of the LCD display 1.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:

1. A liquid crystal display (LCD) panel comprising:
   a backlight unit, configured for providing light for the LCD panel;
   a light-guide unit, comprising a plurality of trapezium objects, the trapezium objects configured for guiding the light from the backlight unit to be emitted vertically with respect to three surfaces of the trapezium object;
   a LCD array unit, comprising a plurality of LCD units each with a concave structure, wherein each LCD unit corresponds to one of the plurality of trapezium objects and comprises a first side, a second side, and a third side, wherein the three sides of the LCD unit are parallel to the three surfaces of the trapezium object respectively, and each side of the LCD unit comprises three liquid crystal molecules and three filters corresponding to liquid crystal molecules;
   wherein liquid crystal molecules of the first sides of all of the LCD units constitute a first liquid crystal molecule array and three liquid crystal molecules of the first side of each of the LCD units constitute a first pixel point; liquid crystal molecules of the second sides of all of the LCD units constitute a second liquid crystal molecule array and three liquid crystal molecules of the second side of each of the LCD units constitute a second pixel point, and liquid crystal molecules of the third sides of all of the LCD units constitute a third liquid crystal molecule array and three liquid crystal molecules of the third side of each of the LCD units constitute a third pixel point, wherein all of the first pixel points form a first display interface, all of the second pixel points form a second display interface, and all of the third pixel points form a third display interface.

2. The LCD panel of claim 1, wherein the three filters are red, green, and blue respectively; and light emitted via the three surfaces of each trapezium object directly reach the first side, the second side, and the third side of the LCD unit, respectively, and when a liquid crystal molecule of one side of the LCD unit is rotated and light is emitted, an area corresponding to the liquid crystal molecule displays corresponding color due to a filtering function of the filter corresponding to the liquid crystal molecule, and when the liquid crystal molecule is rotated and no light is emitted, the area corresponding to the liquid crystal molecule displays black.

3. The LCD panel of claim 1, wherein the first liquid crystal molecule array, the second liquid crystal molecule array, and the third liquid crystal molecule array are controlled by different driving modules, and when the first liquid crystal molecule array, the second liquid crystal molecule array, and the third liquid crystal molecule array are controlled by corresponding driving modules and the liquid crystal molecules of the first liquid crystal molecule array, the second liquid crystal molecule array, and the third liquid crystal molecule array are rotated accordingly, the first display interface, the second display interface, and the third display interface display corresponding content accordingly.

4. The LCD panel of claim 1, wherein the LCD units and the trapezium objects are sized on a nanometric scale.

5. A liquid crystal display (LCD) display device comprising:
   a first display port, configured for connecting to a first computer host and receiving display signals therefrom;

a second display port, configured for connecting to a second computer host and receiving display signals therefrom;
a third display port, configured for connecting to a third computer host and receiving display signals therefrom;
a LCD panel comprising:
   a backlight unit, configured for providing light to the LCD panel;
   a light-guide unit, comprising a plurality of trapezium objects, the trapezium objects configured for guiding the light from the backlight unit to be emitted vertically with respect to three surfaces of the trapezium object;
   a LCD array unit, comprising a plurality of LCD units each with a concave structure, each LCD unit corresponding to one of the plurality of trapezium objects and comprising a first side, a second side, and a third side, the three sides of the LCD unit parallel to the three surfaces of the trapezium object respectively, and each side of the LCD unit comprising three liquid crystal molecules and three filters corresponding thereto;
wherein, the liquid crystal molecules of the first sides of all of the LCD units constitute a first liquid crystal molecule array and three liquid crystal molecules of the first side of each of the LCD units constitute a first pixel point, the liquid crystal molecules of the second sides of all of the LCD units constitute a second liquid crystal molecule array and three liquid crystal molecules of the second side of each of the LCD units constitute a second pixel point, and the liquid crystal molecules of the third sides of all of the LCD units constitute a third liquid crystal molecule array and three liquid crystal molecules of the third side of each of the LCD units constitute a third pixel point, and wherein all of the first pixel points form a first display interface, all of the second pixel points form a second display interface, and all of the third pixel points form a third display interface;
a first signal conversion module configured for converting display signals received by the first display port into control signals;
a first driving module, connected between the first signal conversion module and the first liquid crystal molecule array, and configured for driving the first liquid crystal molecule array according to the control signals converted by the first signal conversion module;
a second signal conversion module configured for converting display signals received by the second display port into control signals;
a second driving module, connected between the second signal conversion module and the second liquid crystal molecule array, and configured for driving the second liquid crystal molecule array according the control signals converted by the second signal conversion module;
a third signal conversion module configured for converting display signals received by the third display port into control signals; and
a third driving module, connected between the third signal conversion module and the third liquid crystal molecule array, and configured for driving the third liquid crystal molecule array according to the control signals converted by the third signal conversion module.

6. The LCD display device of claim 5, wherein the light emitted via the three surfaces of the trapezium object directly reach the first side, the second side, and the third side of the LCD unit, respectively, and when the liquid crystal molecules of one side of the LCD unit are rotated and light emitted, an area corresponding to the liquid crystal molecule display corresponds in color due to a filtering function of the filter corresponding to the liquid crystal molecule, and when the liquid crystal molecules are rotated and no light is emitted, the area corresponding to the liquid crystal molecules displays black.

7. The LCD display device of claim 6, wherein the first display port, the second display port, and the third display port are a VGA port, a DVI port, or a USB port.

* * * * *